July 22, 1924.

H. D. CHURCH

VEHICLE SPRING SUSPENSION

Filed July 22, 1920

Inventor:
Harold D. Church
by Emery, Booth, Janney & Varney
Attys

July 22, 1924.  
H. D. CHURCH  
VEHICLE SPRING SUSPENSION  
Filed July 22, 1920  
1,502,616  
4 Sheets-Sheet 2

Inventor:
Harold D. Church,
by Emery, Booth, Janney & Varney,
Attys.

July 22, 1924.
H. D. CHURCH
VEHICLE SPRING SUSPENSION
Filed July 22, 1920   4 Sheets—Sheet 3
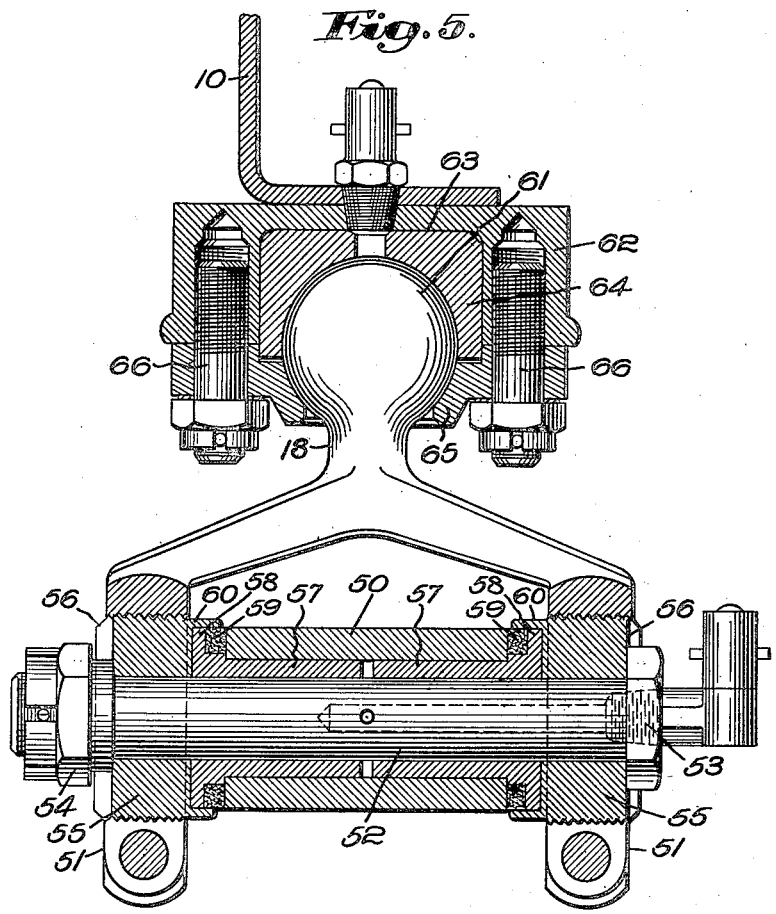
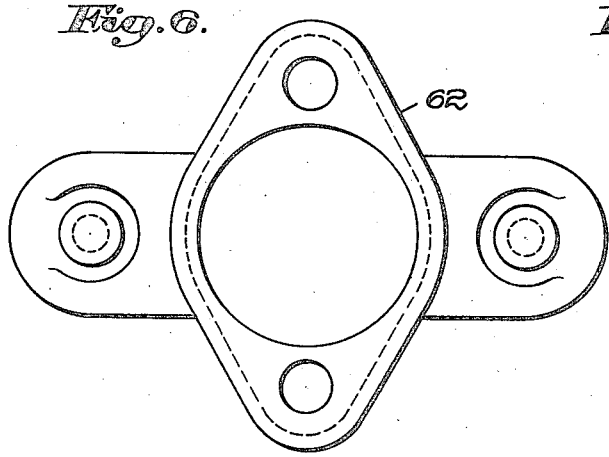
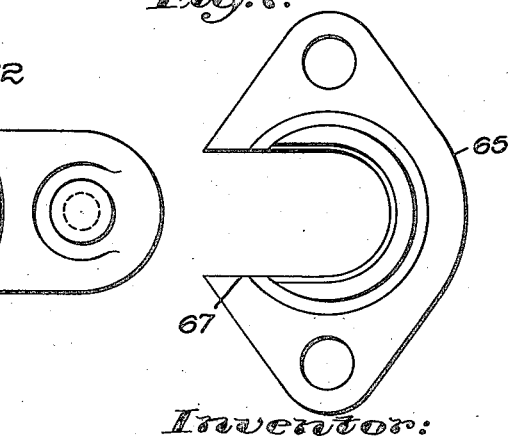
Inventor:
Harold D. Church.

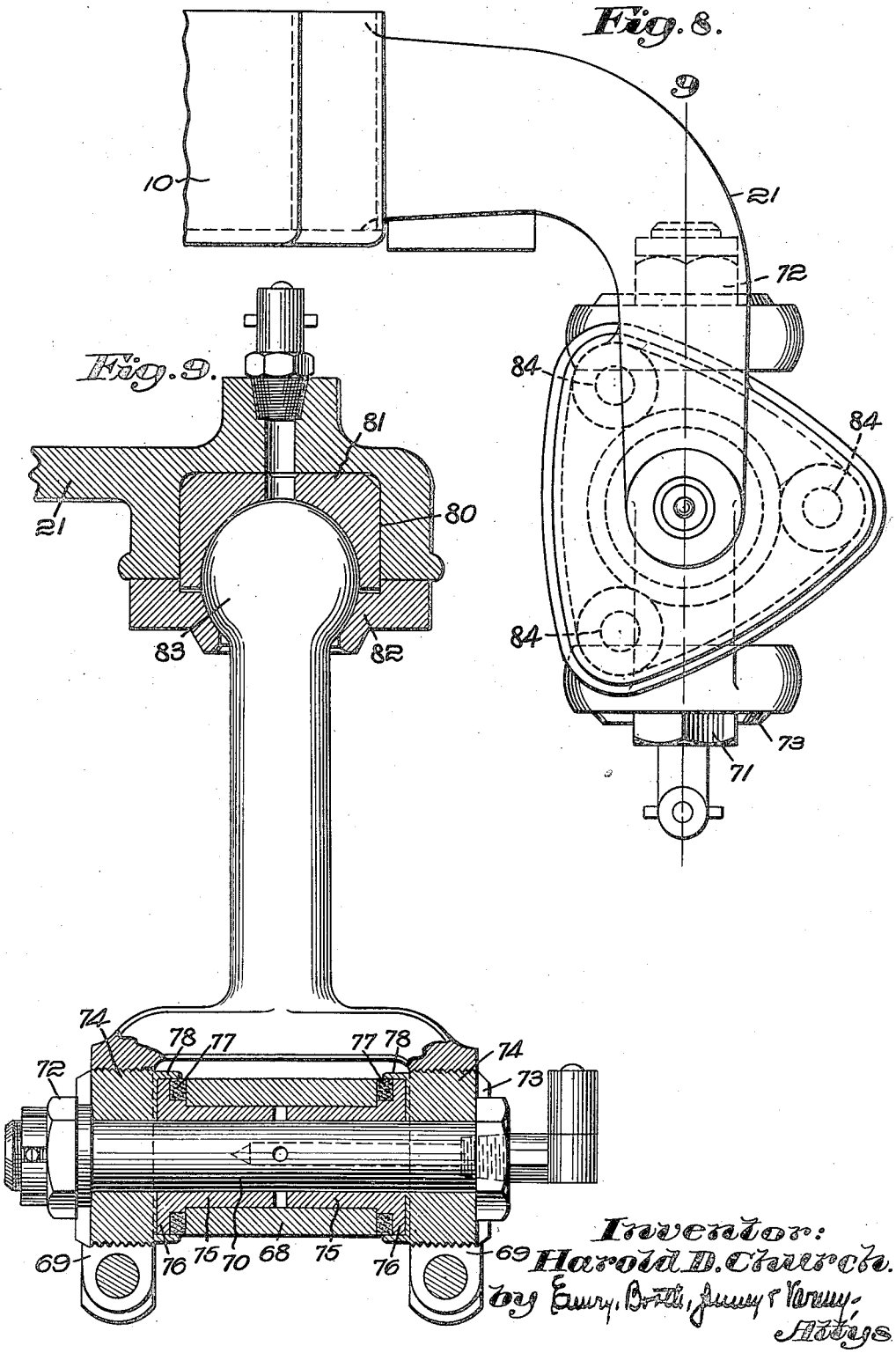

Patented July 22, 1924.

1,502,616

UNITED STATES PATENT OFFICE.

HAROLD D. CHURCH, OF FAIRFIELD, CONNECTICUT, ASSIGNOR, BY MESNE ASSIGNMENTS, TO LOCOMOBILE COMPANY OF AMERICA, INCORPORATED, OF NEW YORK, N. Y., A CORPORATION OF NEW YORK.

VEHICLE SPRING SUSPENSION.

Application filed July 22, 1920. Serial No. 398,171.

*To all whom it may concern:*

Be it known that I, HAROLD D. CHURCH, a citizen of the United States, and a resident of Fairfield, in the county of Fairfield and State of Connecticut, have invented an Improvement in Vehicle Spring Suspensions, of which the following description, in connection with the accompanying drawings, is a specification, like characters on the drawings representing like parts.

This invention relates to vehicle spring suspensions, and is more especially concerned with the pivotal connections between various parts, such as between the springs and spring shackles and between the springs and the frame. The invention aims to provide means to exclude foreign matter from the bearing surfaces, and to provide means of adjustment to prevent undue end play and consequent rattling.

My invention will be best understood by reference to the following description, when taken in connection with the accompanying drawings of one specific embodiment thereof, while its scope will be more particularly pointed out in the appended claims.

In the drawings:

Fig. 5 is a sectional view on an enlarged scale on line 5—5 of Fig. 1;

Fig. 6 is a detail bottom plan of the bracket shown in the upper portion of Fig. 5;

Fig. 7 is a detail bottom plan of the cap which is intended for attachment to the bracket shown in Fig. 6;

Fig. 8 is a detail plan, on an enlarged scale, of the rear horn of the frame, and the spring shackle at the rear end of the rear spring; and Fig. 9 is a sectional view on line 9—9 of Fig. 8.

Figure 1:
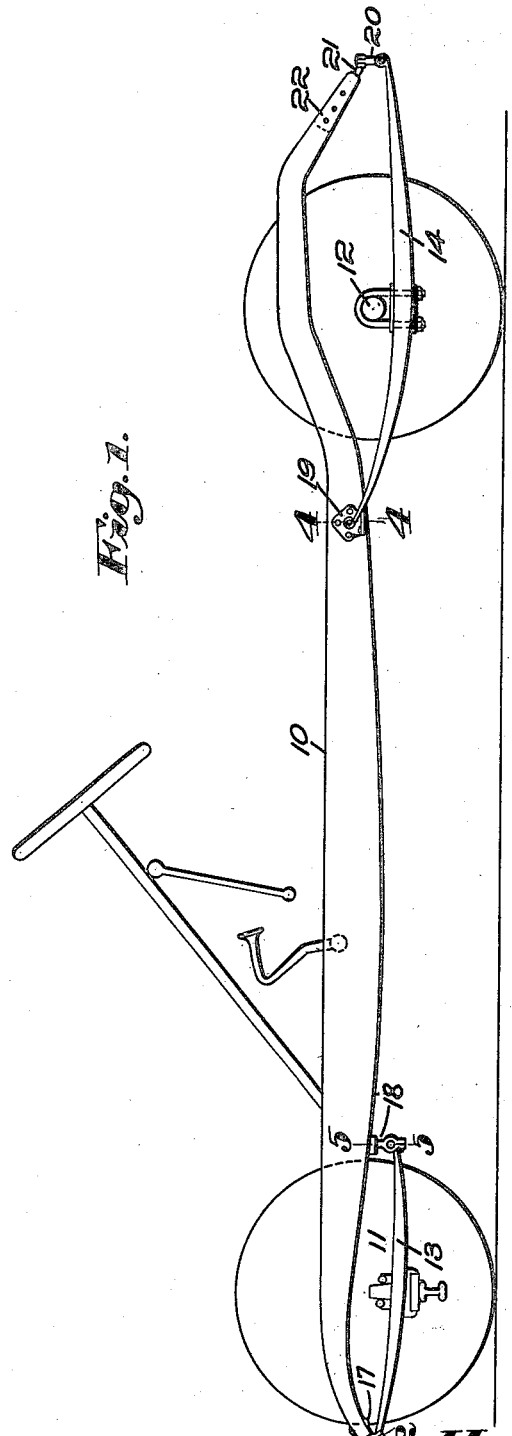
Fig. 1 is a side elevation of a portion of a motor vehicle chassis having a spring suspension exemplifying my invention.

Referring to the drawings, and to the embodiment of my invention which is selected for exemplification, I have shown a portion of a motor vehicle having semi-elliptic springs, although it should be distinctly understood that my invention is susceptible of wide application to spring suspensions of various types. In the present embodiment, the chassis frame comprises usual longitudinal members, one of which is shown and designated 10, the same being supported on usual front and rear axles 11 and 12 by front and rear semi-elliptic springs 13 and 14, respectively.

As is usually the case, the front end of the front spring is received between two ears 15 (see Fig. 2) of a horn 16 of common form secured as by rivets 17 to the front end of the frame member 10. The rear end of the front spring is connected to the frame member by a spring shackle 18 (see Fig. 5). The front end of the rear spring is pivotally attached to a bracket 19 (see Fig. 4), while the rear end of the rear spring is connected by a shackle 20 (see Figs. 8 and 9) to a horn 21 secured as by rivets 22 to the rear end of the frame member 10. My invention is embodied in the pivotal connections at the front and rear ends of both front and rear springs, and, although the details of constructions differ somewhat, depending upon the location of the pivotal connection, the principal features are to be found in each.

Figure 2:
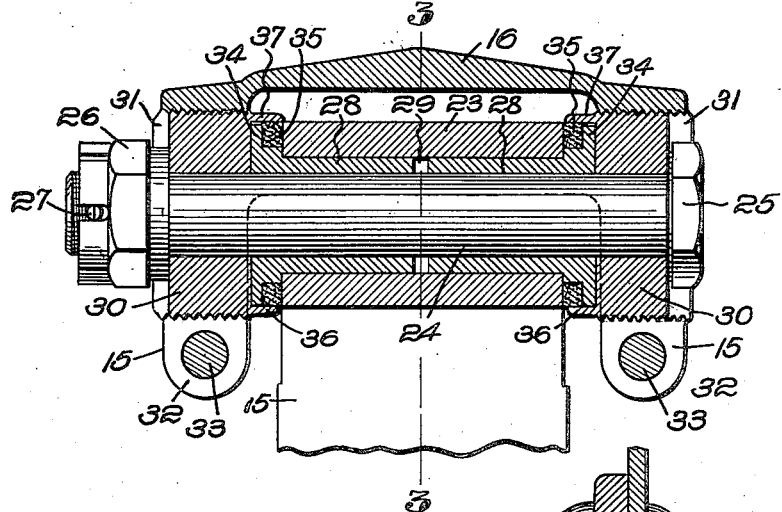
Fig. 2 is a sectional view on an enlarged scale on line 2—2 of Fig. 1.

Referring to Fig. 2, the spring 13 is provided with an eye 23, which is received between the ears 15, and they are pivotally connected together by a suitable pivot, herein a bolt 24 having at one end a polygonal head 25, and at its other end a nut 26, the latter being threaded onto the bolt in a usual manner, and being castellated and normally held against turning movement by a cotter pin 27. The eye 23 is provided with suitable bushing means, herein two separate bushings 28, inserted from opposite ends thereof, and preferably having their inner ends separated from each other by a space 29. These bushings provide bearing surfaces for the pivot and they may be renewed when, after long use, they become worn to such an extent as to make their renewal advisable.

Figure 3:
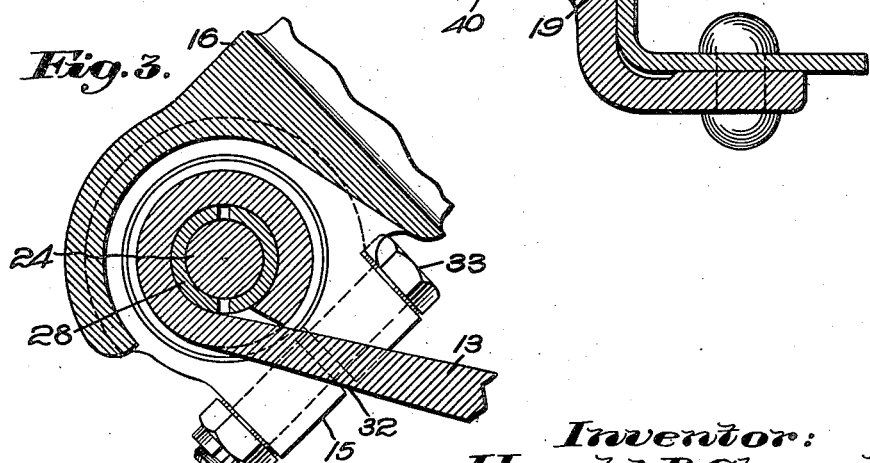
Fig. 3 is a sectional view on line 3—3 of Fig. 2.

The end thrust is received by suitable abutments, herein threaded bushings or collars 30 screwed into the ears 15, and axially adjustable therein to take up end play by simply turning them in the proper direction. To facilitate the adjustment, these bushings are provided with grooves 31 to receive a spanner, or other suitable implement, by means of which they may be turned. One of these grooves serves the additional purpose of normally preventing turning movement of the bolt 24, whose polygonal head 25 fits snugly between the sides of the groove. The proper adjustment, when once secured, is maintained by suitably securing the bushings 30 against rotation, as by providing the ears 15 with slots 32 to render them expansible and contractible (see Fig. 3), and employing clamping bolts 33, which when tightened contract the ears about the bushings and clamp the latter. The end thrust is taken on collars 34 (see Fig. 2), which are preferably formed integral with the bushings 28.

Heretofore, much difficulty has been experienced in the use of motor vehicles, owing to the fact that foreign matter such as dirt and water reaches the bearing surfaces of the spring pivots, and causes rapid wear. The water has a tendency to carry away the lubricating oil or grease and to cause corrosion, and the dirt and has an abrasive effect tending greatly to shorten the life of the parts. In order to exclude foreign matter from the bearing surfaces, and to retain the lubricant, I have provided suitable packing means, herein comprising a pair of yielding washers 35, preferably made of suitable fibrous absorbent material such as felt. In the present example, these washers are interposed between the ends of the eye 23 and the collar portions 34 of the bushings 28, said bushings to this end being provided with shoulders 36 intermediate the collar portions and the eye, and resting against the ends of the latter. The washers are preferably protected by appropriate shields, herein annular flanges 37 conveniently formed integral with the bushings 30, and projecting therefrom inwardly over the circumferential surfaces of the felt washers, thus encircling the latter. In practice, the felt washers will be made sufficiently large in diameter, so that when crowded into the circumferential flanges 37, they will effectually exclude foreign matter from the bearing surfaces, while at the same time preventing undue escape of the lubricant.

Figure 4:
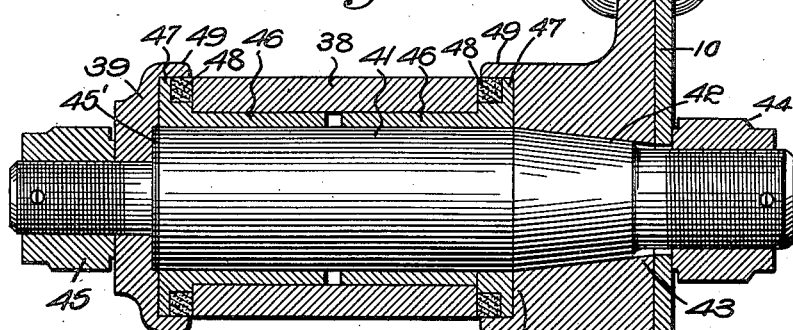
Fig. 4 is a sectional view on an enlarged scale on line 4—4 of Fig. 1.

Referring now to Fig. 4, which illustrates the pivot for the front end of the rear spring, the latter is provided with an eye 38 received between two abutments 39 and 40, one in the form of a collar and the other of a boss integral with the bracket 19. A pivot 41 is in the form of a stud suitably secured to the bracket 19, as by being provided with a tapered shank 42 received in a correspondingly shaped opening 43 in the bracket, and held therein by an eye 44 threaded onto the inner end of the stud. The outer end of the latter is shouldered and threaded to receive a nut 45, by means of which the collar 39 may be adjusted axially to take up any end play, by first removing one of a plurality of shims 45' interposed between the shoulder and the collar.

In this form, as in the one first described, the eye 38 is provided with bushings 46 having collar portions 47 against which the end thrust is received, while felt washers 48 and cooperating shields 49 exclude foreign matter and retain the lubricant in the same manner as the form shown in Fig. 2.

Referring now to Figs. 5, 6 and 7, which show the shackle for the rear end of the front spring, the latter is provided with an eye 50 received between ears 51 formed on the shackle 18. A pivot bolt 52 is provided with a head 53 at one end and a nut 54 at the other. The ears are threaded to receive bushings 55 provided with slots 56. The eye 50 is provided with bushings 57 having collar portions 58 between which and the ends of the eye are washers 59, which cooperate with shields 60 to exclude foreign matter, and retain the lubricant. This form is substantially the same as that which is illustrated in Fig. 2.

The shackle 18 may be suitably connected to the frame 10, as by a ball and socket joint, similar to that disclosed in United States Letters Patent to Crane, No. 1,169,531, dated January 25, 1916. Referring to Fig. 5, the upper end of the shackle is provided with a ball 61 received in a socket comprising a bracket 62 having a chamber 63 for an upper socket member 64 cooperating with a lower socket member 65, the latter being in the form of a cap (see Fig. 7), suitably secured to the bracket as by studs 66, and provided with a slot 67 for the introduction of the neck of the ball.

Referring now to Figs. 8 and 9, wherein I have shown the shackle for the rear end of the rear spring, the latter is provided with an eye 68 received between two ears 69 of the lower end of the shackle 20. A pivot bolt 70 is provided with a head 71 and a nut 72 received in slots 73 of bushings 74, which are threaded into the ears 69. The eye 68 is provided with bushings 75 having collar portions 76 between which and the adjacent ends of the eye are washers 77 cooperating with shields 78 to exclude foreign matter and retain the lubricant. The construction of the pivot for this shackle is similar to that employed for the shackle 18, although the proportions are different.

The upper end of the shackle 20 is suitably connected to the frame member 10, as by a ball and socket joint similar to that shown in Fig. 5. The horn 21 is provided with an integral enlargement 79, having a chamber 80 which receives an upper socket member 81 cooperating with a lower socket member 82 to provide a socket for a ball 83 formed in the upper end of the shackle 20, the cap 82 being suitably secured in place as by studs 84.

Thus in all pivot bolts of the spring suspension, similar provision is made to take up end play and to exclude foreign matter, while at the same time preventing the escape of an undue amount of lubricant, the result being a suspension which will last indefinitely with a minimum amount of attention.

Having thus described these embodiments of my invention, but without limiting myself thereto, what I claim and desire by Letters Patent to secure is:

1. In a vehicle spring suspension, the combination of two pivotally connected parts one of which supports the other, and one of which parts carries abutments between which the other part is received, a pivot about whose axis said parts turn one on the other, bushings having sleeve portions interposed between said pivot and said other part, and collar portions interposed between said abutments and said other part, fibrous washers interposed endwise between said collar portions and said other part, and annular shields carried by said abutments and encircling said washers.

2. In a vehicle spring suspension, the combination of two parts one of which supports the other, said parts presenting axially aligned openings, a bolt extending axially through said openings, two collars encircling said bolt and axially adjustable toward and from each other within said openings of one of said parts, means to secure said collars in their adjusted positions within such openings, each of said collars being provided with an annular flange directed toward the other, two bushings encircling and turning on said bolt and tightly received in the opening of the other of said parts, each bushing being provided with an annular flange interposed between one of said collars and the adjacent end of such other part and provided with an annular seat, and two washers received on said seats, respectively, and encircled by the flanges on said collars, respectively.

In testimony whereof, I have signed my name to this specification.

HAROLD D. CHURCH.